United States Patent [19]

Leal et al.

[11] Patent Number: 5,482,352
[45] Date of Patent: Jan. 9, 1996

[54] CHILD SEAT WITH AUDIO

[76] Inventors: Horacio Leal; Teresita Leal, both of 3420 SW. 84th Ave., Miami, Fla. 33155

[21] Appl. No.: 314,056

[22] Filed: Sep. 28, 1994

[51] Int. Cl.⁶ .................................................. A47C 31/00
[52] U.S. Cl. ................................. 297/217.4; 297/219.12; 297/188.01
[58] Field of Search ........................ 297/188.01, 188.04, 297/188.06, 188.07, 188.08, 188.2, 217.1, 217.3, 217.4, 217.5, 219.1, 219.12, 229, 250.1, 256.16, 230.1, 233, 239, 440.11, 452.13, 452.16, 452.55

[56] References Cited

U.S. PATENT DOCUMENTS

| | | | |
|---|---|---|---|
| 1,700,337 | 1/1929 | Renner | 297/217.4 X |
| 1,934,615 | 11/1933 | Selverstone | 297/188.2 X |
| 2,879,835 | 3/1959 | Miller | 297/217.4 |
| 4,750,783 | 6/1988 | Irby et al. | 297/256.16 |
| 4,775,183 | 10/1988 | Tsuge et al. | 297/219.12 |
| 4,885,200 | 12/1989 | Perdelwitz, Jr. et al. | 297/219.12 X |
| 4,892,353 | 1/1990 | Goddard | 297/229 X |
| 4,979,777 | 12/1990 | Takada | 297/217.4 X |
| 5,083,837 | 1/1992 | Roach | 297/217.1 X |
| 5,314,403 | 5/1994 | Shaw | 297/217.4 X |
| 5,318,340 | 6/1994 | Henry | 297/217.4 X |

FOREIGN PATENT DOCUMENTS

| | | | |
|---|---|---|---|
| 1259088 | 3/1961 | France | 297/217.4 |
| 1445150 | 8/1976 | United Kingdom | 297/217.4 |

*Primary Examiner*—Milton Nelson, Jr.
*Attorney, Agent, or Firm*—Robert M. Downey

[57] ABSTRACT

An audio apparatus for a child's seat includes a compartment for carrying an audio source therein and speakers positioned and disposed for optimum audibility relative to a child in the seat, and conductors extending between the speakers and a jack in the compartment for electrically interconnecting the audio source to the speakers.

5 Claims, 2 Drawing Sheets

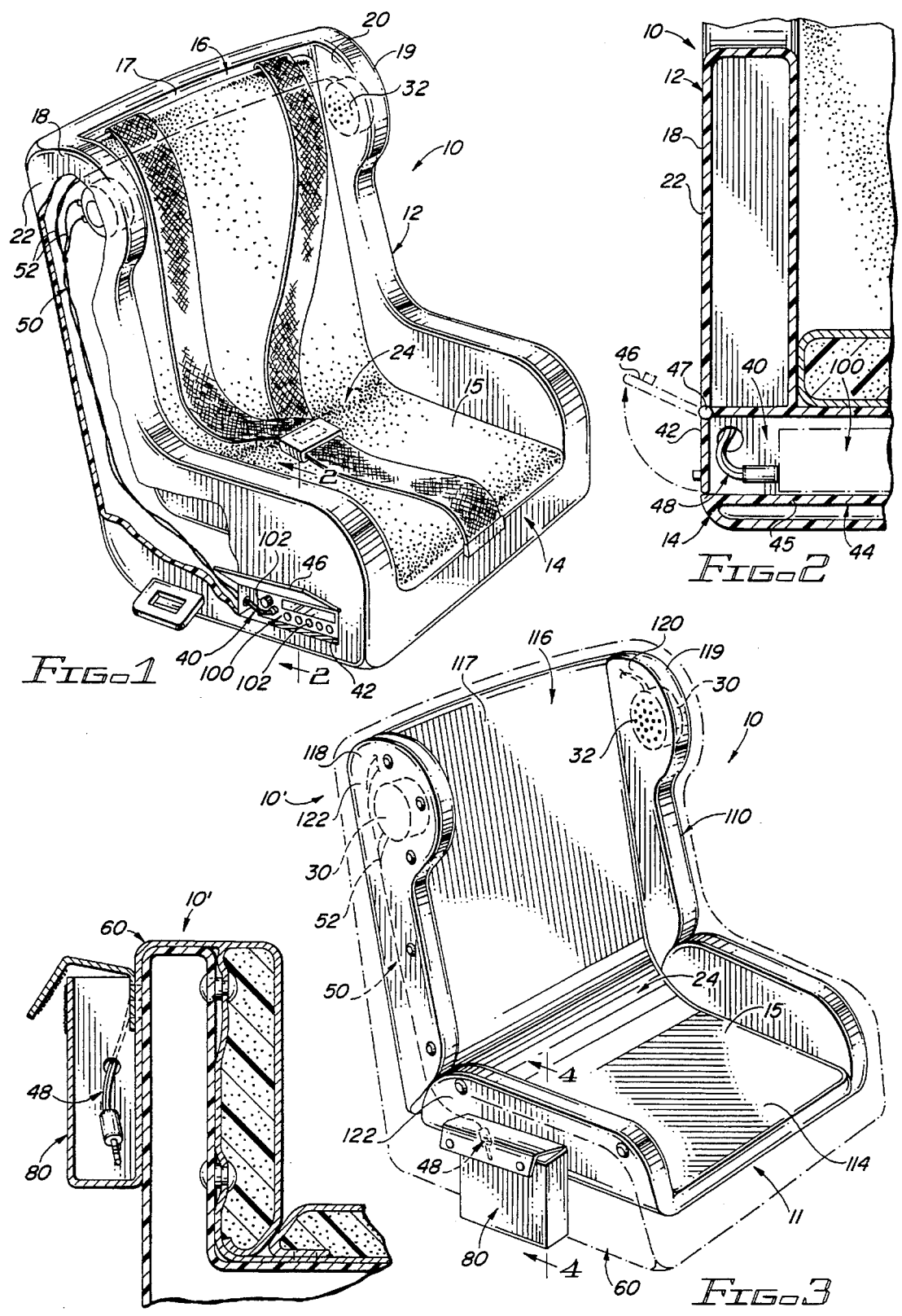

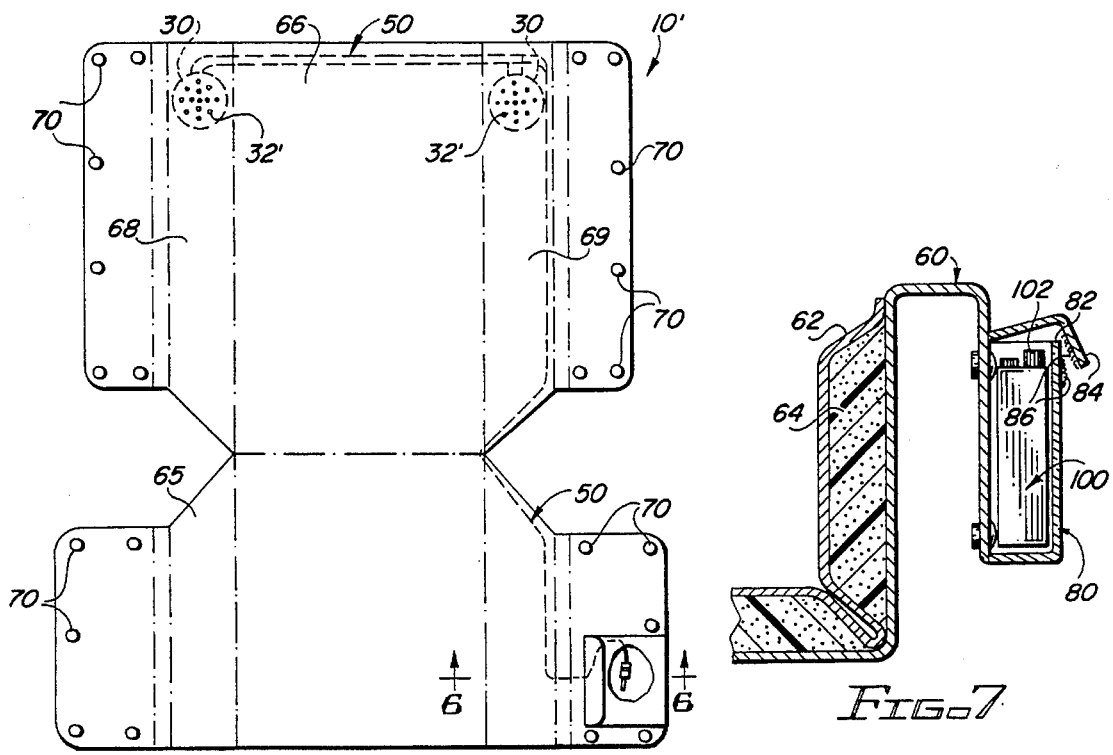
FIG-5
FIG-7
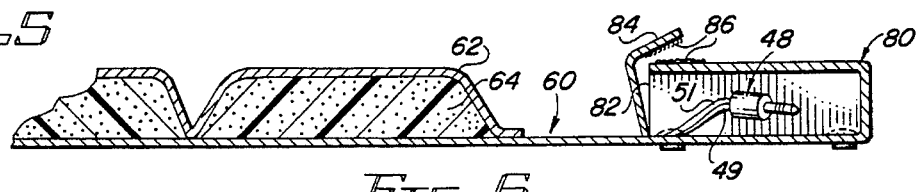
FIG-6
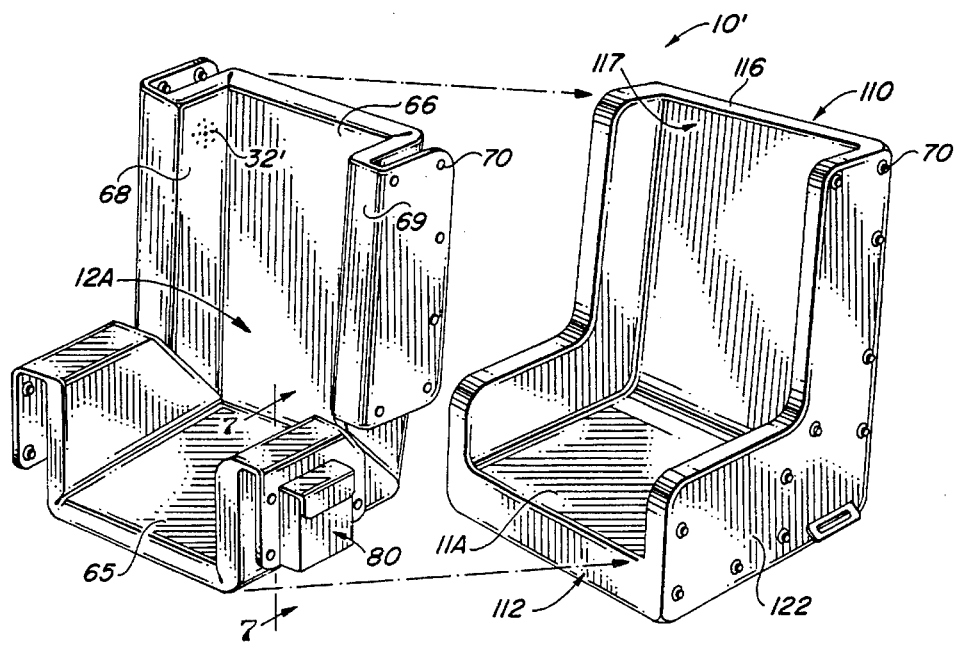
FIG-8

CHILD SEAT WITH AUDIO

BACKGROUND OF THE INVENTION

1. Field of the Invention

The present invention relates to an apparatus in combination with a child seat, and more particularly, to an apparatus for providing audio on a child seat.

2. Description of the Related Art

One of the endless challenges anyone with children faces is the need to occupy their attention on an almost continuous basis. Many times, even a short intermission in the entertainment causes children to become anxious or agitated and, otherwise generally annoying to those around them. This is especially true when trying to keep a child seated for any extended period of time, such as when driving, walking with a stroller or at the dinner table. Anyone who has driven with children in the car has experienced the inevitable cries of "when are we going to get there?" or the constant fighting and bickering between two rival siblings, presenting a real challenge to the driver's ability to remain patient and focused on the road.

To address this problem, some child car seats, strollers and high-chairs have been fitted with such gadgets as dials, spinning wheels, knobs and other moving or attention grabbing objects. Most of these devices are successful in capturing a child's interest for 5 to 10 minutes, and after that it's back to the same old routine.

The present invention is designed to overcome the shortcomings of the prior art by providing for an audio apparatus for use in combination with a child seat including speakers, means for carrying an audio source on the seat and conductor means for interconnecting the speakers and the audio source. The apparatus may be constructed as a child seat or as an apron to be used with existing child seats. It has been found that a child is more inclined to remain seated if the child has something to listen to which is of specific interest to children. The present invention allows a child to listen to his/her favorite musical programs such as sing-along childrens songs or sound tracks from popular childrens movies when locked up in a car seat or stroller. Additionally, story telling audio programs may be used, wherein children can listen to their favorite stories and read along while riding in the car or stroller. Accordingly, parents can better concentrate on driving while listening to the car stereo, as their children are captivated and entertained by their own audio program.

SUMMARY OF THE INVENTION

The present invention is directed to an audio apparatus in combination with a child seat which includes speakers structured and disposed to transmit sound in the direction of the seating area, means for carrying an audio source on the seat, and conductor means for electrically interconnecting the audio source to the speakers. The apparatus may be constructed as a child seat to include a base, a backrest in generally perpendicular relation to the base, and a pair of vertically extending opposite side panels. A speaker is mounted within each side panel and electrically interconnected by wires concealed within the seat to an electrical connector or jack. The electrical connector is mounted within a compartment integrally formed within one of the side panels and is structured for electrical interconnection to the audio source. The compartment includes an opening to facilitate placement and removal of the audio source therein, as well as access to controls such as volume, tuning, play, stop etc. The compartment further includes means for supporting the audio source therein.

Alternatively, the apparatus may be constructed as an apron or seat cushion to be used with existing child seats, wherein the speakers are fitted within the apron and electrically interconnected by wires concealed within the apron to an electrical plug. The electrical plug is located within a pouch on the apron and is structured for electrical interconnection to an audio source. The pouch includes an open end and a flap for covering the open end and is structured to carry the audio source therein.

With the foregoing in mind, it is an object of the present invention to provide an audio apparatus for use with a child seat to provide sound audible to a person seated in the seat.

It is another object of the present invention to provide an audio apparatus which is adapted to be used with existing child seats and structured to be audible to a person seated in the seat.

It is a further object of the present invention to provide an audio apparatus for use in combination with a child seat, with means for carrying an audio source on the seat.

These and other objects and advantages of the present invention will become more readily apparent in the description which follows.

BRIEF DESCRIPTION OF THE DRAWINGS

For a fuller understanding of the nature of the present invention, reference should be had to the following detailed description taken in connection with the accompanying drawings in which:

FIG. 1 is a front perspective view of a first preferred embodiment of the apparatus of the present invention.

FIG. 2 is an isolated view, in partial section, taken along the line 2—2 of FIG. 1.

FIG. 3 is a perspective view, in partial phantom illustrating another embodiment of the present invention.

FIG. 4 is a sectional view taken along the line 4—4 of FIG. 3.

FIG. 5 is a top plan view of still another embodiment of the present invention.

FIG. 6 is a sectional view taken along the line 6—6 of FIG. 5.

FIG. 7 is a sectional view, similar to that of FIG. 6, showing the embodiment of FIG. 5 in an operable position with an audio source contained in a pouch thereof.

FIG. 8 is an exploded view, shown in perspective, illustrating the attachment of the embodiment of FIG. 5 to an existing child seat.

Like reference numerals refer to like parts throughout the several views of the drawings.

DETAILED DESCRIPTION OF THE PREFERRED EMBODIMENTS

With reference to FIGS. 1–8, the present invention is directed to an audio apparatus for use in combination with a child seat. In one preferred embodiment, as shown in FIGS. 1 and 2, the apparatus 10 comprises a child seat 12 constructed of a rigid plastic or other rigid material and includes a base 14 with an upper support surface 15 integrally attached to a backrest 16 with a front face 17, the backrest 16 being in generally perpendicular relation to the base 14, and a pair of vertically extending opposite side panels 18, 19, each side panel having an inboard face 20 and an outboard face 22. A seating area 24 is defined by the upper support surface 15 of the base, front face 17 of the backrest and inboard faces 20 of the side panels 18, 19.

Speakers 30 are mounted within each side panel 18, 19 and are structured and disposed to transmit sound upon receipt of electrical signals from an audio source 100. The speakers 30 are further structured and disposed to transmit sound through apertures 32 in the inboard face 20, in the direction of the seating area 24 so as to be audible to a person seated within the seating area.

A compartment 40 is integrally formed within one of the side panels 18 and includes an open end 42 in the outboard face 22 of the side panel and support means 44, such as a floor 45, structured and disposed for supported receipt of an audio source therein. A door 46 may be provided to conceal the compartment 40 and to prevent a child seated in the apparatus from tampering with the audio source 100. As seen in FIG. 2, the door 46 may include hinge means 47 or other means to facilitate movement of the door 46 in order to provide access to the compartment 40 and audio source 100 therein. The compartment further includes an electrical connector 48, such as a jack or plug, structured for mating engagement with a corresponding electrical connector or port on the audio source 100.

The audio source 100 is carried and supported in the compartment 40 and electrically interconnected to the connector 48 within the compartment for transmitting electrical audio signals to the speakers upon operation thereof. Control means 102 for controlling the operation of the audio source 100 are accessible at the open end 42 of the compartment.

A wire harness 50 is concealed within the seat and includes electrical wires 52 for providing electrical interconnection between the speakers 30 and the electrical connector 48 in the compartment. The wires are structured to conduct electrical signals transmitted from the audio source 100 to the speakers 30.

In a second preferred embodiment, as seen in FIGS. 3–8, the apparatus 10' may be used with existing child seats 110 by being constructed as a flexible apron 60 adapted to be removably attached to the child seat 110 in covering relation thereto. The apron 60 includes an outer casing 62 of vinyl, canvas or other flexible material and an inner cushion 64 formed of foam rubber or like material. A lower portion 65 of the outer casing 62 is structured to be mounted on the upper support surface 114 of the seat base 112 in covering relation thereto. An upper portion 66 of the apron 60 is structured to be mounted on the front face 117 of the backrest 116 in covering relation thereto, and a pair of opposite side portions 68, 69 structured to cover the inboard faces 120 of the side panels. A seating area 124 is defined by the lower portion 65, upper portion 66, and opposite side portions 68, 69 when the apron is attached to the child seat 110. Standard snap type fasteners 70 can be provided along the periphery of the apron 60 and on the seat 110 to secure the apron to the child seat. Alternatively, other fastening means, such as belts, elastic straps, or ties, may be used to secure the apron 60 to the seat 110.

A speaker 30 is mounted within each side portion 68, 69 of the apron 60 and is structured and disposed to transmit sound upon receipt of electrical signals from an audio source 100. The speakers 30 are further structured and disposed to transmit sound through small openings or apertures 32' in the apron, in the direction of the seating area when the apron 60 is attached to the child seat 110.

A pouch 80 is integrally attached to one of the side portions 68, 69 of the apron 60 and is structured to carry the audio source 100 therein, as seen in FIG. 7. The pouch 80 is further structured to be positioned over the outboard face 122 of one of the side panels 118, 119 of the child seat when the apron 60 is attached to the child seat 110. The pouch 80 includes an open end 82 structured to face upwards when the apron 60 is attached to the child seat and an electrical plug 48 or jack attached to a free distal end 49 of a wire 51, structured for mating engagement with a corresponding electrical connector on an audio source. The pouch further includes a flap 84 for covering the open end 82 of the pouch, thereby securing the contents of the pouch therein, and fastening means 86 for securing the flap over the open end of the pouch. The fastening means 86 may include hook and loop means, snaps or other fastening devices on the flap, with corresponding fasteners on the outside face of the pouch.

A wire harness 50 is concealed within the apron 60 and includes electrical wires 51 for providing electrical interconnection between the speakers 30 and the electrical plug 48 in the pouch 80. The wires 51 are structured to conduct the electrical audio signals transmitted from an audio source to the speakers 30.

The present invention can be incorporated into a wide variety of child seats including car seats, strollers and high-chairs. The invention will entertain and capture the interest of a child so that the child will enjoy staying in the seat for extended periods of time, enabling the parent or guardian of the child to focus on other matters, such as driving a car.

The invention has been shown and described in what is considered to be practical and preferred embodiments. However, the number of speakers, compartments and pouches, as well as their exact locations may be modified. Further, the type of audio source (cassette, CD, radio) and the apron material, may vary. Accordingly, it is recognized that departures may be made within the spirit and scope of the following claims which, therefore, should not be limited except within the Doctrine of Equivalents.

What is claimed is:

1. An apron for use on a child seat including a seat base, a backrest and oppositely disposed armrests, said apron comprising:

a flexible body including a top layer and a bottom layer and further including a lower portion defining a seat base cover, an upper portion defining a backrest cover, and opposite side flaps extending from said lower portion and defining armrest covers, securing means on said apron body for removably attaching said apron to the child seat, means formed on said apron body for carrying an audio playing source and including a pouch structured and configured to receive the audio playing source in supported, captivated relation therein, speaker means on said apron body, structured and disposed to transmit sound therefrom, and conductor means including a wire harness extending between said top and bottom layers of said apron body from said pouch to said speaker means for delivering electrical sound signals to said speaker means, and including a free distal end zone within said pouch and an audio plug attached to said distal end zone for electrical connection to the audio source.

2. An apron as recited in claim 1 further including a foam cushion layer between said top and bottom layers of said apron body.

3. An apron as recited in claim 1 wherein said securing means is structured and disposed to secure said apron on the child seat so that said lower portion is disposed in covering relation to the seat base, said upper portion is disposed in covering relation to the backrest and said side flaps are disposed in covering relation to respective ones of the oppositely disposed armrests of the child seat.

4. An apron as recited in claim 1 wherein said apron body further includes opposite side panels extending from said upper portion.

5. An apron as recited in claim 4 wherein said speaker means includes at least two audio speakers each secured to a respective one of said opposite side panels.

\* \* \* \* \*